United States Patent [19]

Busujima et al.

[11] Patent Number: 4,657,382

[45] Date of Patent: Apr. 14, 1987

[54] LASER MEASUREMENT SYSTEM

[75] Inventors: Hiroshi Busujima; Hiroyasu Ohtani, both of Tokyo, Japan

[73] Assignee: NEC Corporation, Tokyo, Japan

[21] Appl. No.: 594,899

[22] Filed: Mar. 29, 1984

[30] Foreign Application Priority Data

Mar. 31, 1983 [JP] Japan .................................. 58-55452

[51] Int. Cl.$^4$ ............................................... G01C 3/08
[52] U.S. Cl. ........................................... 356/4; 356/5
[58] Field of Search ................. 356/5, 4, 152; 343/7.5

[56] References Cited

U.S. PATENT DOCUMENTS

| | | | |
|---|---|---|---|
| 3,696,248 | 10/1972 | Cunningham et al. | 356/152 X |
| 3,830,567 | 8/1974 | Riegl | 356/5 |
| 3,848,999 | 11/1974 | Dall'Armi | 356/5 X |
| 4,140,060 | 2/1979 | Brenner | 356/5 X |
| 4,197,006 | 4/1980 | Maillet | 356/5 |
| 4,288,158 | 9/1981 | Früngel | 356/5 X |

OTHER PUBLICATIONS

R. J. Matthys et al. "CO$_2$ Transversely Excited Atmospheric (TEA) Laser Rangefinder", SPIE vol. 227, CO$_2$ Laser Devices and Applications, pp. 91–97 (1980).
M. J. Taylor et al, "Pulsed CO$_2$ TEA Laser Rangefinder", Applied Optics, vol. 17, No. 6, pp. 885–889 (Mar. 1978).

Primary Examiner—Stephen C. Buczinski
Assistant Examiner—Linda J. Wallace
Attorney, Agent, or Firm—Schwartz, Jeffery, Schwaab, Mack, Blumenthal & Evans

[57] ABSTRACT

A laser measurement system uses a high and low power laser beam to determine measurements such as rangefinding, atmospheric molecular composition and the like. A low-power laser beam is initially transmitted to detect obstructions in the path desired to be measured. The intensity of the reflected beam provides an indication of any such obstructions. Only if the path is obstruction free is the high power laser beam transmitted to effect the desired measurement. The system thus prevents harmful effects of the energy reflections from obstructions in the measuring path.

20 Claims, 4 Drawing Figures ated result.

LASER MEASUREMENT SYSTEM

BACKGROUND OF THE INVENTION

The present invention relates to a measurement system using laser beams.

Some of the measuring systems utilizing the high power and high directability of laser beams are rangefinders measuring distances to targets, laser radars measuring the molecular composition of the atmosphere, etc., and other systems. These systems transmit very strong laser beams. If there is a scattering surface or a man at a short distance in the path of the transmitted beam, therefore, a strongly-scattered beam is returned to the beam receiver, which could damage an optical detector and the eyes or skin of humans. Even when no damage is inflicted on the components of the receiver, the strong return beam can exceed the dynamic range of the optical detector and amplifier, etc., making it impossible to obtain specific reception signals from a target located at a short distance.

In conventional systems, accordingly, the absence of scattering surfaces or humans in the path of the transmitted beam is confirmed visually to ensure safety prior to the actual measurement, and if there is any scattering surface or the like in the path, an attenuator is put in a beam receiver unit for the measurement. This makes it difficult to carry out a rapid measurement, and it also necessitates the provision of an attachment such as nocturnal vision apparatus at night, since unaided visual confirmation is impossible then.

SUMMARY OF THE INVENTION

An object of the present invention is to provide a laser measurement system which has a high safety and enables automatic measurement.

Another object of the present invention is to provide a rangefinder which has these characteristics.

Still another object of the present invention is to provide a laser radar system which has these characteristics.

The present invention makes it possible to obtain a laser measurement system which is provided with a transmitter unit transmitting at least two kinds of laser beams into the space being searched, a receiver unit receiving reflected light in response to a first laser beam transmitted initially and converting the light into an electrical signals, a decision unit generating a first signal when the level of the reflected light signal obtained within a predetermined time after the transmission is higher than a predetermined threshold $Th_1$, and a control unit inhibiting the transmission of a second laser beam which is different from the first beam when the first signal is generated. Actual measurement can be performed after the confirmation of safety obtained by this system, provided that the power of the second laser beam is set to be larger than that of the first laser beam.

DETAILED DESCRIPTION OF THE PREFERRED EMBODIMENTS

Figure 1:
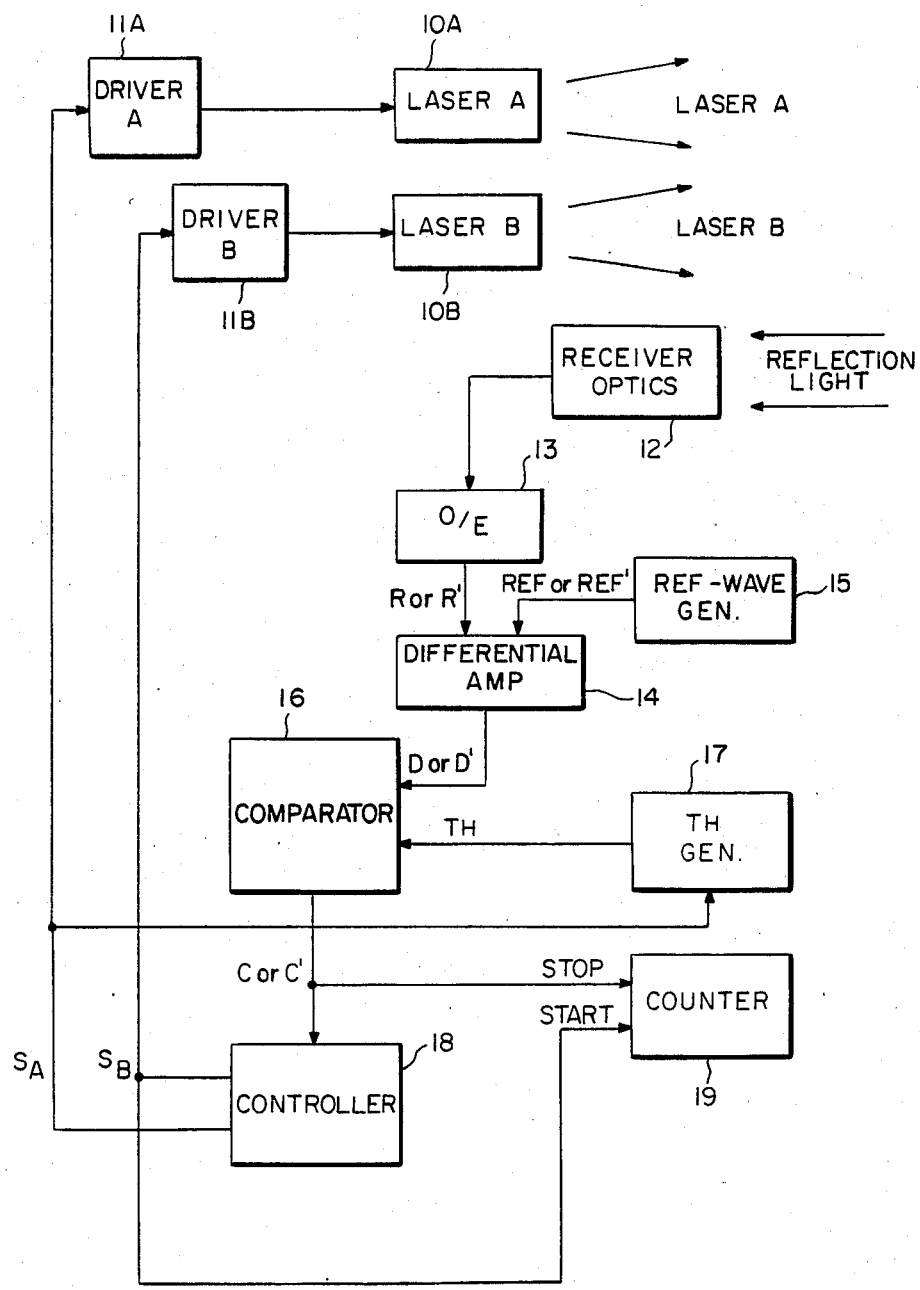
FIG. 1 is a block diagram of an embodiment of the laser measurement system according to the present invention.

FIG. 1 is a block diagram of a laser measurement system embodying the present invention, illustrating the application thereof to a rangefinder. In this figure, laser sources 10A and 10B respectively transmit relatively low-power and high-power laser beams which enable long-range measurement, and are driven by the outputs of drivers 11A and 11B operating according to transmission instruction signals $S_A$ and $S_B$, respectively, from a controller 18. As will be described more fully below, laser source 10A is caused to transmit beam A first, and laser source 10B is caused to transmit beam B only when the reflected component of the beam A satisfies certain predetermined conditions. A reflected beam in response to the laser beam transmitted by laser source 10A is received by receiver optics 12, and is then converted into an electrical signal R by an optical/electric (O/E) converter 13. A reference-wave generator 15 generates a REF signal with a waveform analogous to the waveform of a signal of the so-called Mie or Rayleigh scattered light received immediately after the transmission. Since the molecular composition in the atmosphere is usually known, this waveform can be obtained easily from a charging waveform obtained from a CR time constant circuit consisting of, for instance, a capacitor and a resistor. The REF signal can also be obtained simply by a method wherein digital data obtained by sampling a reference waveform assumed beforehand is stored in a memory, is read out sequentially therefrom during the generation of the REF signal, and is then passed through a low-frequency filter.

A differential amplifier 14 subtracts the REF signal from the signal R from the O/E converter 13 to remove the fluctuations in the reception signal caused by Mie scattering or Rayleigh scattering.

A threshold generator 17 supplies a comparator 16 with a threshold signal TH which has two levels $Th_1$ and $Th_2$. Level $Th_1$ is for detecting strongly reflected beams from obstacles located at a short distance, and it is set to be large and have a time duration $T_1$ corresponding to that short distance. Level $Th_2$ is for detecting signals reflected from targets located at a relatively long distance, and is set to be relatively small. The length of its duration depends on the detection range.

The comparator 16 compares a reflection signal D from the differential amplifier 14 with the threshold levels $Th_1$ and $Th_2$ and generates an output pulse C when $D > Th_1$ or $D > Th_2$.

When it receives the pulse C generated when $D > Th_1$ within the time $T_1$, the controller 18 reaches the decision that there is an obstacle at a short distance, and inhibits the output of the instruction signal $S_B$ for the transmission of the high-power laser beam B. When $D < Th_1$ within the time $T_1$, on the other hand, the controller 18 reaches the decision that there is no obstacle within a short distance, and outputs the instruction signal $S_B$ for the transmission of the high-power laser beam B.

A counter 19 is provided for measuring the distance to the target. It starts counting when the high-power laser beam is transmitted (that is, when the signal $S_B$ is generated), stops the count when the signal D exceeds the level $Th_2$. The distance to the target is measured on the basis of this counted result.

The above is only a description in outline. More detailed descriptions of the general construction of the rangefinder are disclosed in the article "Pulsed $CO_2$ TEA laser rangefinder" by M. J. Taylor et al., APPLIED OPTICS, Vol. 17, No. 6, Mar. 15, 1978, pp. 885 to 889, and the article "$CO_2$ transversely excited atmospheric (TEA) laser rangefinder" by R. J. Matthys et al., SPIE Vol. 227, $CO_2$ Laser Devices and Applications, 1980, pp. 91 to 97.

The actual operation of the rangefinder of FIG. 1 will now be described with reference to the timing charts of FIGS. 2A and 2B.

Figure 2A:
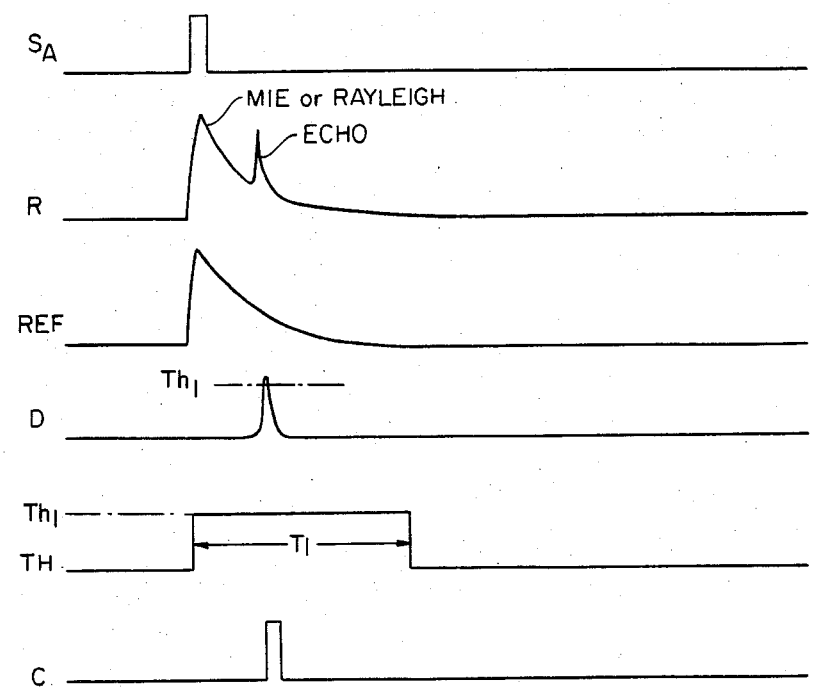
FIGS. 2A and 2B are timing charts of signals from each of the units, illustrating the operation of the embodiment of FIG. 1.
Figure 2B:
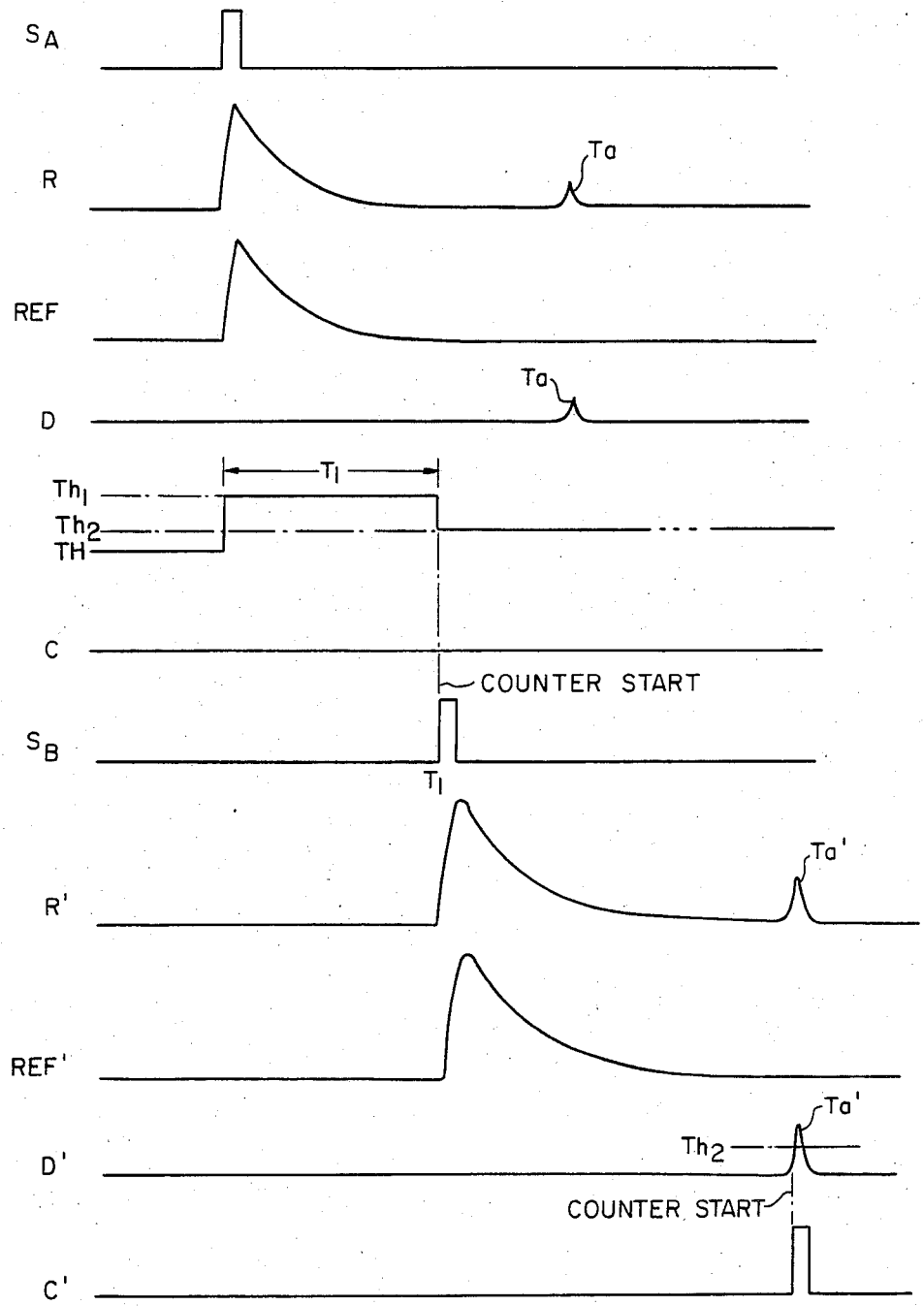

FIG. 2A shows the timing chart of the operation when there is an obstacle at a short distance. First an instruction signal $S_A$ is generated from the controller 18 at the start of the rangefinding. Responding to the signal $S_A$, the driver 11A drives a laser source 10A to transmit a low-level laser beam A.

A reflection signal in response to this laser beam A is passed through the receiver optics 12 and the O/E converter 13 to obtain a signal R. This signal R contains Mie or Rayleigh scattered light signal on which the signal reflected from an obstacle is superimposed. The reference waveform generator 15 generates, in synchronization with the signal $S_A$, a REF signal prepared beforehand as described previously.

The differential amplifier 14 executed prescribed processing to remove the Mie or Rayleigh scattered-light component signal based on the signals R and REF, and the differential component of these signals is output therefrom as a signal D. The comparator 16 compares the signal D with the signal TH, and generates a signal C when $D > Th_1$. If the signal C is generated within the time $T_1$, controller 18 decides that there is an obstacle within a short range, and the transmission of the high-power laser beam B is inhibited. The system can subsequently perform operations such as transmitting the laser beam A again after a prescribed period of time, or transmitting the laser beam A in another detection direction, as required.

Next a description will be made of an ordinary rangefinding operation performed when there is no obstacle within a short range, with reference to FIG. 2B.

In this case, the processes as far as the removal of the scattered-light component from the reflection signal are the same as those described with reference to FIG. 2A. The signal thus obtained contains a target signal Ta. However, it does not appear in the signal C because its level is less than $Th_1$. Since there is no signal reflected from an obstacle within the time $T_1$ in this case, the controller 18 generates an instruction signal $S_B$ to the driver 11B at time $T_1$. The laser source 10B, driven by the driver 11B, transmits the high-power laser beam B. Meanwhile, the instruction signal $S_B$ is transmitted as a start signal to the counter 19 to make it start counting. The reflected signal is received in receiver optics 12 and converted to an electrical signal in the O/E converter 13 to generate reflection signal R'.

The reflection signal R' in response to the laser beam B is processed by the differential amplifier 14 which takes the difference thereof from a reference signal REF' to provide a signal D' from which the scattered-light component has been removed. A target signal Ta' (of a larger level than the signal Ta since it is the response to a high-power laser beam) within the signal D' is judged to be larger than the threshold level $Th_2$ by the comparator 16, and a target detection signal C' is thereby generated. The signal C' is supplied as a stop signal to the counter 19 to make it stop counting. The distance to the target is calculated from the count thus obtained.

Figure 3:
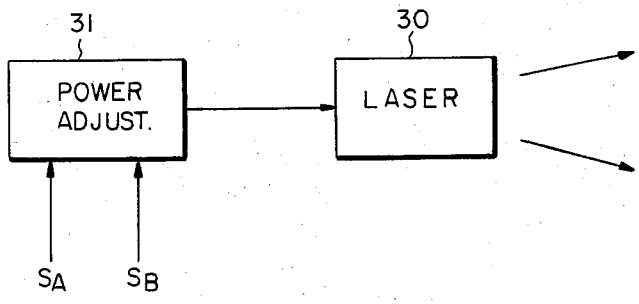
FIG. 3 is a block diagram of a simplified part of the embodiment of FIG. 1.

The laser sources 10A and 10B and the drivers 11A and 11B are described above as separate devices. It is clear that they can be replaced by a single laser source 30 and a single power-adjusting unit 31, as shown in FIG. 3. In this case, the laser source 30 is adjusted by the power-adjusting unit 31 so that a low-power laser beam A is transmitted according to the instruction signal $S_A$, and a high-power laser beam B according to the instruction signal $S_B$.

The power of the transmitted laser beams is not limited to two levels, but can be three or more levels if required. It would be useful to transmit a third laser pulse of an even higher power to expand the range of detection further when the second laser pulse transmitted, after safety has been confirmed by the absence of any obstacle at short range, is insufficient for the rangefinding of an object at long range, for instance. Furthermore, the types of the laser sources may be differentiated by making not only their powers different, but also the wavelengths of the laser beams transmitted.

The differential amplifier 14 can, of course, be replaced by an adder by inverting the polarity of the REF signal from the REF signal generator 15.

The power of the laser beams transmitted can be changed by changing the peak value of the laser pulses and the widths thereof. Thus, a desirable power from the safety point of view can be obtained by reducing the peak value and increasing the pulse width when it is likely that someone is nearby. The precision of the measurement can be sufficiently good using a pulse of a narrow width and a large peak value.

It is apparent that the present invention can be applied to a laser radar measurement system. A laser radar is designed to measure, for instance, the composition of molecules (e.g. those of nitrogeous compounds) in the atmosphere, or the density of clouds, by utilizing the fact that specific materials (their molecules) are resonant with light of specific wavelengths. The construction of the laser radar is disclosed in the article "Laser radar monitoring of the polar middle atmosphere" by Iwasaki Y et al., Mem. Nat'l. Inst. Polar Res., Spec. Issue 19, 1981, pp. 178 to 187. With laser radar, laser beams are often transmitted toward the sky. Therefore it can be easily understood that the present invention is effective when there is an airborne object such as an airplane in the sky.

What is claimed is:

1. A laser measurement system comprising:
   a transmitter unit for transmitting a first laser beam and a second laser beam different from said first laser beam into the area being searched;
   a receiver unit for receiving light reflected in response to the first laser beam and transducing said light into an electrical signal;
   a decision unit responsive to said electrical signal of the receiver unit for generating a first signal when the level of said electrical signal obtained within a predetermined period of time after transmission of said first laser beam is higher than a predetermined threshold $Th_1$;
   a control unit inhibiting the transmission of said second laser beam only in response to said first signal of said decision unit and for otherwise permitting transmission of said second laser beam; and means, responsive to said receiver unit receiving reflected light from said second laser beam, for measuring the distance to an object in the area being searched.

2. The laser measurement system according to claim 1, wherein said first and second laser beams have different intensities, and said second laser beam has a greater intensity than said first laser beam.

3. The laser measurement system according to claim 1, wherein said at least two different laser beams have different wavelengths.

4. The laser measurement system according to claim 1, wherein said transmitter unit comprises a single laser source and a single adjuster for adjusting the intensity of the first and second laser beams transmitted from said single laser source.

5. The laser measurement system according to claim 2, wherein said transmitter unit has a means for changing the peak value or the width of pulses of said first and second laser beams.

6. A method of preventing transmission of a high-power laser beam by a laser measurement system when there is an obstruction in the path of the high-power laser beam comprising the steps of:
(a) transmitting a low-power laser beam along the path;
(b) determining the temporal variation in intensity of a reflected component of the low-power laser beam; and
(c) subsequently transmitting the high-power laser beam only when the determined temporal variation in intensity indicates that the path is free from obstruction.

7. A method as recited in claim 6, wherein the determining step comprises the steps of:
receiving the reflected component of the low-power laser beam;
generating a first electrical signal indicative of the temporal variation in intensity of the reflected component of the low-power laser beam;
determining whether the intensity exceeds a predetermined threshold within a predetermined time after the transmission of the low-power laser beam; and
generating an inhibiting signal if it is determined in the previous step that the intensity exceeds said predetermined threshold within said predetermined period after transmission of the low-power laser beam.

8. A method as recited in claim 7, further including the additional steps of:
between the first generating step and the determining step, generating a predetermined reference electrical signal having a temporal variation in intensity corresponding to the temporal variation in intensity of said low-power laser beam which is reflected by atmospheric scattering; and
subtracting the reference electrical signal from the electrical signal to remove a component of the temporal variation in intensity due to said scattering.

9. Apparatus for preventing transmission of a high-power laser beam by a laser measurement system when there is an obstruction in the path of the high-power laser beam comprising:
means for transmitting a low-power laser beam along the path;
means for determining the temporal variation in intensity of a reflected component of the low-power laser beam; and
means responsive to the determining means for transmitting the high-power laser beam only when the determined temporal variation in intensity indicates that there is no obstruction in said path.

10. An apparatus as recited in claim 9, wherein said determining means further comprises:
means for receiving the reflected component of the low-power laser beam;
means responsive to the reflected component of the low-power laser beam from said receiving means for generating a first electrical signal indicative of the temporal variation in intensity of the reflected component of the low-power laser beam;
means responsive to said first electrical signal from said generating means for determining whether said first electrical signal exceeds a predetermined threshold within a predetermined period of time after the transmitting means transmits the low-power laser beam;
means responsive to the determining means for generating an inhibiting signal when said determining means determines that the electrical signal has exceeded the predetermined threshold within the predetermined period; and
said means for transmitting said high-power laser beam responsive to said exhibiting signal for preventing transmission of said high-power laser means.

11. An apparatus as recited in claim 10, further comprising:
means for generating a reference electrical signal having a temporal variation in intensity corresponding to temporal variation in intensity of a reflected component of the low-power laser beam generated by scattering absent an obstruction; and
means for substracting said reference electrical signal from said first electrical signal to remove scattering components in said first electrical signal.

12. An apparatus as recited in claim 9, wherein the means for transmitting the low-power laser beam and means for transmitting the high-power laser beam comprise:
a single source of laser radiation; and
means connected to the single source of laser radiation for varying the intensity of a laser beam emitted by the single source.

13. A laser measurement system comprising:
a transmitter unit for transmitting a first laser beam and a second laser beam,
a receiver unit for receiving a first reflected beam of said first laser beam and a second reflected beam of said second laser beam,
decision means for detecting the presence or absence of said first reflected beam during a predetermined time interval after said first laser beam is transmitted,
control means for inhibiting the transmission of said second laser beam when the presence of said first reflected beam is detected by said decision means and for enabling the transmission of said second laser beam when the absence of said first reflected beam is detected, and
output means for generating an output indicative of a laser measurement by use of said second reflected beam.

14. The laser measurement system according to claim 13, wherein said receiving unit generates an electrical signal in response to said first reflected beam and wherein said decision means comprises a reference signal generator for generating a predetermined reference signal of a waveform analogous to the waveform of an electrical signal generated in response to Mie or Rayleigh scattering, a scattered-light component removing means for removing a scattered-light component by subtracting said reference signal from said electrical signal of said receiving unit, and a comparator for detecting the presence of said first reflected beam when an output of said scattered-light component moving means has a higher level than a predetermined threshold $Th_1$.

15. The laser measurement system according to claim 14, wherein said reference signal generator is a CR time constant circuit.

16. The laser measurement system according to claim 13, wherein said laser measurement is a distance measurement and output means measures the distance of a target based on the time taken from the transmission of said second laser beam to the reception of said second reflected beam.

17. The laser measuring system according to claim 13, wherein said at least two different laser beams have different wavelengths.

18. A transmission preventing system of a high-power laser beam which is used for measuring a distance to a target, comprising:
a transmitter unit for transmitting a low-power laser beam;
a receiver unit for receiving a first reflected beam of said low-power laser beam;
detection means for generating a detection signal when the presence of said first reflected beam is detected within a predetermined period of time from transmission of said low-power laser beam; and
control means responsive to said detection signal for inhibiting the transmission of said high-power laser beam.

19. A laser measurement system comprising:
transmitting means for transmitting a low-power laser beam and a high-power laser beam after the transmission of said low power laser beam;
receiver means for receiving light reflected in response to said low-power and high-power laser beams, said light including first and second reflected beams of said low-power and high-power laser beams, respectively;
decision means for detecting the presence of said first reflected beam within a predetermined period of time after the transmission of said low-power laser beam by comparing said received light with a first threshold level;
control means connected to said transmitting means and said decision means for selectively controlling said transmitting unit to prevent said high-power laser beam from being transmitted to a target only when said decision means detects the presence of said first reflected beam within said predetermined period of time; and
rangefinding means for measuring a distance from said laser measurement system to said target in accordance with said second reflected beam of said high-power laser beam by comparing said received light with a second threshold level and by counting a period of time from the transmission of said high-power laser beam to the detection of said second reflected beam, said second threshold level being lower than said first threshold level.

20. The laser measurement system according to claim 19, further comprising a reference waveform generator for generating a Mie or Rayleigh scattered-light component signal and a differential amplifier for subtracting said Mie or Rayleigh scattered-light component signal from said light received by said receiver means, the output of said differential amplifier being supplied to said decision means.

* * * * *